(12) United States Patent
Randhawa et al.

(10) Patent No.: US 9,544,371 B1
(45) Date of Patent: Jan. 10, 2017

(54) METHOD TO DISCOVER MULTIPLE PATHS TO DISK DEVICES CLUSTER WIDE

(71) Applicant: Symantec Corporation, Mountain View, CA (US)

(72) Inventors: Amarinder Singh Randhawa, Sunnyvale, CA (US); Sathish Nayak, San Jose, CA (US); Prasanta Ranjan Dash, San Jose, CA (US)

(73) Assignee: Veritas Technologies LLC, Mountain View, CA (US)

( * ) Notice: Subject to any disclaimer, the term of this patent is extended or adjusted under 35 U.S.C. 154(b) by 0 days.

(21) Appl. No.: 14/691,076

(22) Filed: Apr. 20, 2015

Related U.S. Application Data

(63) Continuation of application No. 13/410,044, filed on Mar. 1, 2012, now Pat. No. 9,015,371.

(51) Int. Cl.
| | |
|---|---|
| *G06F 3/00* | (2006.01) |
| *H04L 29/08* | (2006.01) |
| *H04L 12/715* | (2013.01) |
| *H04L 12/707* | (2013.01) |
| *G06F 13/40* | (2006.01) |

(52) U.S. Cl.
CPC ........... *H04L 67/1097* (2013.01); *H04L 45/24* (2013.01); *H04L 45/46* (2013.01); *G06F 13/4063* (2013.01)

(58) Field of Classification Search
CPC ...... H04L 67/1097; H04L 45/24; H04L 45/46; G06F 13/4063
See application file for complete search history.

(56) References Cited

U.S. PATENT DOCUMENTS

| | | | | |
|---|---|---|---|---|
| 6,654,902 B1* | 11/2003 | Brunelle | ............... | G06F 3/0601 711/156 |
| 6,671,776 B1* | 12/2003 | DeKoning | ............ | G06F 3/0607 710/38 |
| 6,804,703 B1* | 10/2004 | Allen | ...................... | H04L 69/40 709/216 |
| 7,778,157 B1* | 8/2010 | Tawri | .................. | G06F 11/2005 370/216 |
| 8,670,326 B1* | 3/2014 | Balasubramanian | ... | H04L 45/22 370/238 |
| 8,990,367 B2* | 3/2015 | Michael | ............ | G06F 17/30315 709/208 |

(Continued)

OTHER PUBLICATIONS

"Dynamic multi-pathing overview" pp. 614-648 in "Veritas Storage Foundation Administrator's Guide 5.1", Symantec, 2008.*

(Continued)

*Primary Examiner* — Jing-Yih Shyu
(74) *Attorney, Agent, or Firm* — Campbell Stephenson LLP

(57) ABSTRACT

A system and method for determining a status of a connection path. For example, the method can include receiving a control message at a first node of a number of nodes that are configured to form a cluster, identifying a second node of the nodes as a node from which the control message was received, identifying a storage device to which the second node is coupled; and determining a status of a connection path. The connection path is between the first node and the second node, and the second node and the storage device. The first node includes a first computer system, and the second node includes a second computer system.

20 Claims, 11 Drawing Sheets

(56) References Cited

U.S. PATENT DOCUMENTS

| | | | | |
|---|---|---|---|---|
| 2003/0187945 | A1* | 10/2003 | Lubbers | G06F 11/201 709/213 |
| 2004/0215764 | A1* | 10/2004 | Allen | H04L 41/12 709/224 |
| 2006/0047907 | A1* | 3/2006 | Shiga | G06F 3/0605 711/114 |
| 2009/0019098 | A1* | 1/2009 | Gunda | G06F 11/004 |

OTHER PUBLICATIONS

"Dynamic Multipathing" by Dhiren Patel, M.G. Venkatesha, Christopher Naddeo, and Sathish Nayak, Apr. 22, 2005.*

"Linux Multipathing" by Edward Goggin, Alasdair Kergon, Christophe Varoqui, and David Olien, 2005 Linux Symposium.*

"Sun Cluster Reference Manual for Solaris OS", retrived from http://docs.oracle.comJcd/E 19787-01/820-2756/cldevice-lcl/index.html, © 2010, Oracle Corporation.*

\* cited by examiner

Map 310

| Present | Present | ... | Present |
|---|---|---|---|
| Node 1 | Node 2 | ... | Node N |

FIG. 3A

Updated Map 320

| Present | Absent | ... | Present |
|---|---|---|---|
| Node 1 | Node 2 | ... | Node N |

FIG. 3B

Updated Map Extension 330

| | Node 1 | Node 2 | ... | Node N |
|---|---|---|---|---|
| Path 1 | Present | Absent | ... | Present |
| Path 2 | Present | Absent | ... | Present |

FIG. 3C

Updated Map Extension 340

| | Node 1 | Node 2 | ... | Node N |
|---|---|---|---|---|
| Path 1 | Present | Absent | ... | Present |
| Path 2 | Present | | | |

FIG. 3D

METHOD TO DISCOVER MULTIPLE PATHS TO DISK DEVICES CLUSTER WIDE

CROSS-REFERENCE TO RELATED APPLICATIONS

The present patent application is a continuation of U.S. patent application Ser. No. 13/410,044, filed Mar. 1, 2012, and entitled "Method to Discover Multiple Paths to Disk Devices Cluster Wide," which is hereby incorporated by reference herein, in its entirety and for all purposes.

FIELD OF THE INVENTION

This invention relates to multi-pathing, more particularly, to multi-pathing host computers within a cluster.

DESCRIPTION OF THE RELATED ART

Multi-pathing is a technique used for identifying and managing multiple paths that exist from a host computer to a storage device. Once identified, these paths can be used to transmit data requests (e.g., input/output (I/O) requests) from the host computer to the storage device. The collection and storage of information regarding available paths to a host computer allows the host computer to process data requests more efficiently. This is because the host computer is able to apply load balancing schemes to select one path from the set of available paths to process a data request.

BRIEF DESCRIPTION OF THE DRAWINGS

The present invention may be better understood, and its numerous objects, features and advantages made apparent to those skilled in the art by referencing the accompanying drawings.

FIG. 3A illustrates an example of a map, according to one embodiment of the present invention.

FIG. 3B illustrates an example of an updated map, according to one embodiment of the present invention.

FIG. 3C illustrates an example of an extension of an updated map, according to one embodiment of the present invention.

FIG. 3D illustrates another example of an extension of an updated map, according to one embodiment of the present invention.

Figure 1:
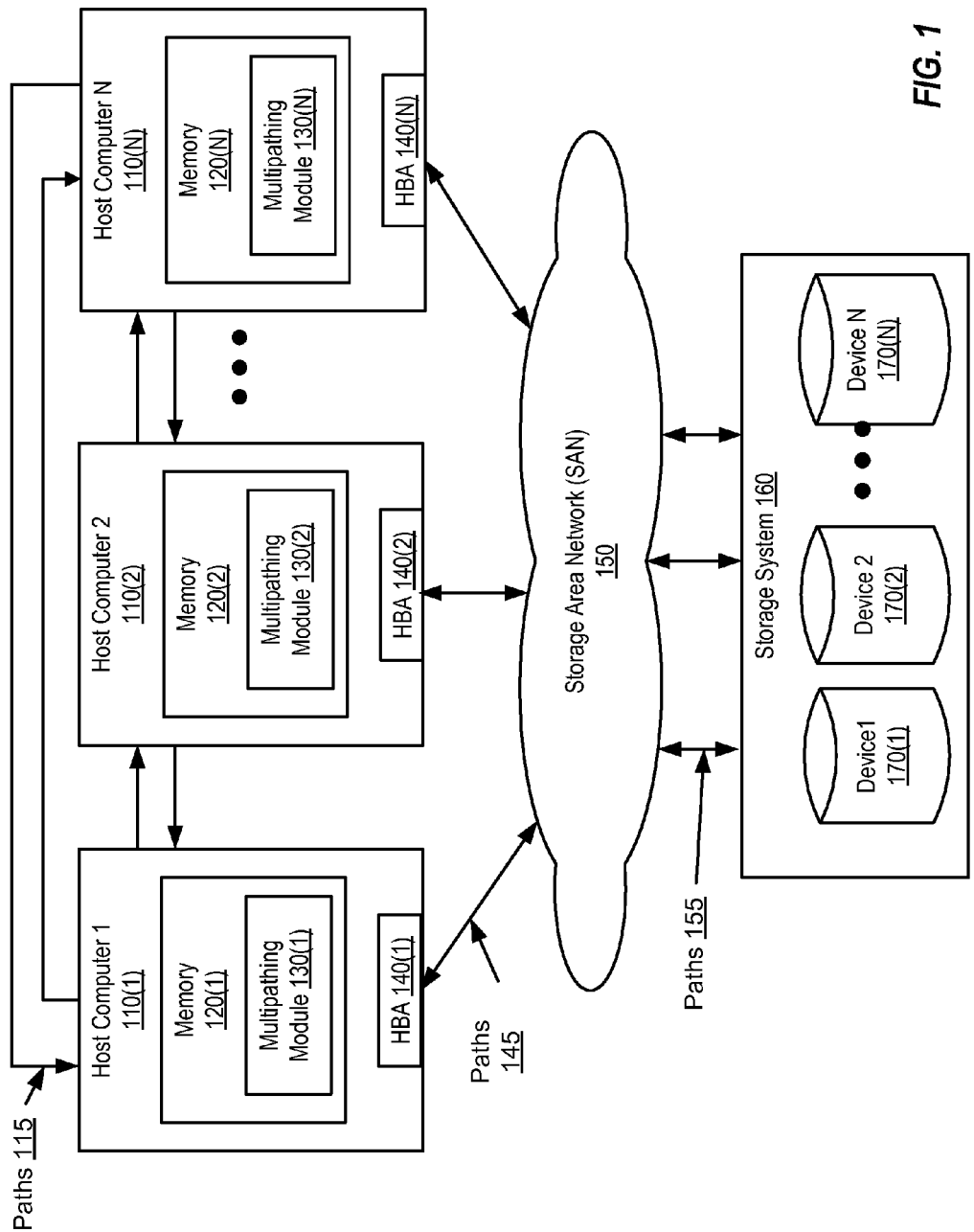
FIG. 1 is a block diagram showing a system for multi-pathing host computers within a cluster, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents, and alternatives falling within the spirit and scope of the invention defined by the appended claims.

DETAILED DESCRIPTION

Multi-pathing is a technique by which available communication paths existing from a host computer to a storage device are discovered. Often times, a host computer can be connected to a single storage device by one or more paths. Multiple paths between a host computer and a storage device provide many benefits to a host computer. For example, multiple paths from a host computer to a storage device allows the host computer to continue accessing the device, even when one or more paths have become inaccessible, so long as one communication path remains accessible. In addition, a host computer is able to select one of multiple accessible paths on which to transmit an I/O request based on load-balancing schemes that consider the characteristics and workload of each accessible path.

A multi-pathing module within a host computer performs such a multi-pathing technique, in which available paths existing from the host computer to a storage device are detected and recorded. Current multi-pathing techniques allow a host computer to identify paths to a storage device that are locally visible to a host computer. These paths may include, for example, paths existing from a host computer to a storage area network, paths existing from a host computer to a storage system, paths existing from a storage area network to a storage system, and the like. Such techniques are applied similarly using various protocols, such as iSCSI, FCIP, and the like.

In some cases, however, a host computer may form part of a cluster. A cluster consists of a group of host computers that are connected together via a network. The host computers in the cluster work together and share resources (such as storage devices within a storage system) to provide services to an application. If a host computer becomes part of a cluster, additional paths may exist from the host computer to the storage device via other host computers in the cluster. For example, a path may exist from a first host computer to a second host computer within a cluster, where the second host computer includes a path to a storage device.

Unfortunately, when a host computer becomes part of a cluster, the additional paths existing between host computers via a network are not locally visible from a host computer and thus will not be identified and represented using current multi-pathing techniques. In such a scenario, multi-pathing information for a host computer is not cluster aware. This can lead to load balancing schemes that are optimized for a host computer, but not necessarily optimized for a cluster or a collection of host computers.

The system of FIG. 1 provides for a multi-pathing module that can identify, detect, and maintain information regarding all paths available to a host computer (including paths that are locally visible to a host computer and paths that are available via a network). Identifying and representing all available paths is beneficial because such an approach allows a host computer to optimize the routing of I/O requests.

As shown, FIG. 1 includes N number of host computers 110, illustrated as host computer 110(1), 110(2) . . . 110(N). Each of host computers 110(1)-(N) further includes N number of memories 120, illustrated as memory 120(1), 120(2) . . . 120(N), N number of multi-pathing modules 130, illustrated as multi-pathing module 130(1), 130(2) . . . 130(N), and N number of host bus adapters (HBAs) 140, illustrated as HBA 140(1), 140(2), . . . 140(N). Although not shown, each host computer 110 can further include multiple HBAs 140.

Host computers 110 form part of a clustered environment (e.g., a cluster of host computers). Host computers 110 are able to communicate with one another via a network (not shown). Such a network allows for paths to be established between host computers. These paths are illustrated as paths 115. As shown, host computer 110(1) has a path 115 to communicate with host computer 110(2) and another path 115 to communicate with host computer 110(N). Similarly, host computer 110(2) and host computer 110(N) have paths 115 to communicate with each other and paths to communicate with host computer 110(1). Paths 115 may be created and/or severed at any time after a cluster of host computers has been formed. In addition, paths 115 may change due to modifications or failures in the network, storage area network, storage system, adapters, and/or host computers.

Each host computer 110 includes a memory 120. Memory 120 may comprise random access memory, read only memory, removable disk memory, flash memory, and/or various combinations of these types of memory. Each memory 120 stores a multi-pathing module 130, which may include executable instructions. Multi-pathing module 130 is the module that identifies, detects, monitors, and updates information regarding the available paths that exist for a host computer.

Multi-pathing module 130 identifies paths that are locally visible to a host computer 110 when host computer 110 is first initialized and further identifies paths available via a network at the time host computer 110 joins a cluster. This information is recorded and stored within multi-pathing module 130. Thereafter, multi-pathing module detects changes to these paths. In the event that changes have occurred (e.g., a new path has been detected, a previous path has been made inaccessible, or a previous path has been made accessible), multi-pathing module 130 can automatically modify the path information stored at host computer 110. In addition, multi-pathing module 130 can also notify other multi-pathing modules 130 at other host computers 110 about the path changes. The details regarding how multi-pathing module 130 generates, monitors, and updates path information can be seen in FIGS. 2-8.

Host computers 110 further include HBAs 140. Although not shown, each host computer 110 can include one or more HBAs 140. HBAs 140 are adapters that connect host computers 110 to other network or storage components and facilitate communications between such components. As shown, HBAs 140 are used to couple host computers 110 to storage area network 150 via paths 145. Using HBAs 140 and paths 145, host computers 110 can communicate with storage area network 150 and storage system 160.

Storage area network 150 is a network for controlling and monitoring the routing of I/O requests and data from host computers 110 to storage system 160 and vice versa. Storage area network 150 may include multiple components, such as bridges, and the like. As shown, storage area network 150 communicates with storage system 160 via paths 155.

Storage system 160 may include a combination of different storage devices that store data used and requested by host computers 110. Examples of storage devices within storage system 160 can include Redundant Array of Independent Disks (RAID) systems, disk arrays, Just a Bunch of Disks (JBODs), tape devices, and optical storage devices. As shown, storage system 160 includes N number of storage devices 170, illustrated as device 170(1), 170(2) . . . 170(N).

Figure 2:
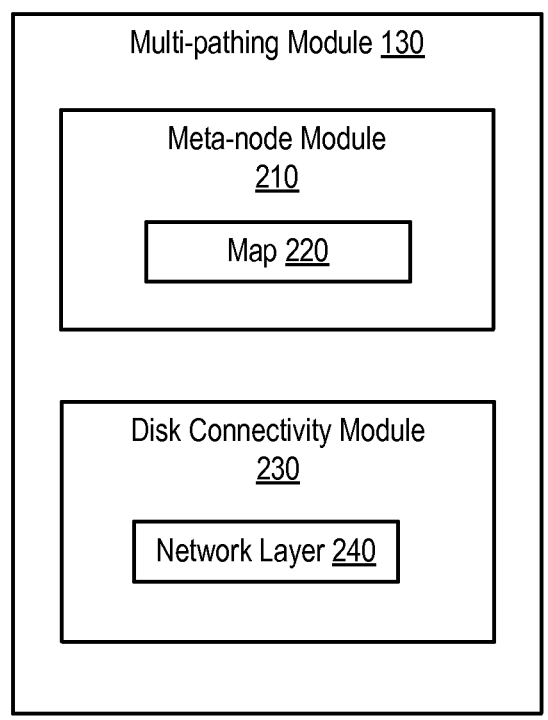
FIG. 2 illustrates a multi-pathing module, according to one embodiment of the present invention.

FIG. 2 illustrates a multi-pathing module 130. Multi-pathing module 130 resides within a host computer (e.g. such as host computer 110 in FIG. 1). If a host computer is part of a cluster, each host computer in the cluster should include a multi-pathing module. Multi-pathing module 130 allows for the discovery, storage, and/or maintenance of information regarding paths existing from a host computer to a storage device. This path information is used for the distribution of I/O requests to a storage device. Particularly, path information can be utilized by a multi-pathing module in a host computer to try and optimize the use of paths via load-balancing techniques.

Multi-pathing module 130, as shown, includes meta-node 210 (which further includes a data structure, e.g., map 220) and disk connectivity module 230 (which further includes network layer 240). As shown, one multi-pathing module 130 (including one meta-node 210) exists for each host computer. In such scenarios, a data structure, such as map 220, can be used to represent individual paths for each storage device to which the host computer is coupled. For example, if a host computer is coupled to two storage devices, meta-node 210 includes two data structures, such as maps 220, to represent the path information for the two storage devices. Alternatively, multi-pathing module 130 can also include multiple meta-nodes 210, with each meta-node module 210 representing a different storage device to which a host computer is coupled. In an even further embodiment, disk connectivity module 230 can be external to multi-pathing module 130.

Meta-node 210 includes information regarding a host computer and can further include information regarding the host computer's connectivity to other components (e.g., other host computers in a cluster, storage area networks, storage devices, and so on). Information regarding the connectivity of a host computer can be stored, for example, in map 220. Map 220 can be a data structure that represents the status of one or more paths existing from the host computer to a single storage device. In the event that a host computer is coupled to more than one storage device, multiple maps 220 can exist, with each map 220 corresponding to one storage device.

Map 220 includes indicators for the paths existing from a host computer to a storage device. These indicators can indicate whether a path is present and accessible or absent and thus inaccessible. The contents of map 220 are initially configured when a host computer is initialized and later updated when the host computer joins a cluster. However, the contents of map 220 can be and should be maintained to reflect the most up-to-date path status information.

Disk connectivity module 230 identifies, tracks, and reports changes to paths existing at a host computer.

Changes to a path are detected by disk connectivity module 230 and information regarding such changes is transmitted (e.g., via a notification or a message) to meta-node 210 and map 220. Transmitting information regarding path changes to map 220 allows map 220 to maintain up-to-date path information. Network layer 240 may be used by disk connectivity module 230 to send and receive messages from other cluster components. For example, messages conveying information regarding a path change are sent to other host computers in a cluster via network layer 240. Similarly, messages conveying information regarding a path change at other host computers can be received via network layer 240.

As shown, disk connectivity module 230 resides within multi-pathing module 130. Alternatively, disk connectivity module 230 can also be a module that is external to multi-pathing module 130. In yet another embodiment, the functionality of disk connectivity module 230 can also be incorporated into multi-pathing module 130 without the need for a separate module, such as disk connectivity module 230.

FIG. 3A illustrates an example of a map 310. Map 310 is a data structure that illustrates the status of paths existing between a host computer and a storage device. Map 310 includes status indicators for host computers 1-N, illustrated as nodes 1-N. Multiple paths can exist between a host computer and a storage device. As such, map 310 is used to represent the multiple paths that exist from a host computer (e.g., a node) and a storage device.

Map 310, as shown, tracks available paths on a node basis. Thus, map 310 illustrates whether at least one path exists between nodes in a cluster and whether such paths lead to a storage device. Alternatively, map 310 could be modified to track available paths on a path basis (e.g., including an indicator for each individual path). The status indicators used in map 310 are "absent" or "present." Such indicators indicate whether at least one path is absent or present between a host computer and a storage device. However, other types of indicators can also be used. For example, map 310 can be designed to use up/down indicators, "1" or "0" values, and so on. Other types of indicators can also be used, in combination with the above general indicators, to indicate a path's level of degradation and/or to indicate a path's priority (e.g., in the form of a priority integer). Such additional indicators can be used by load balancing logic in a multi-pathing module to assign the appropriate level of priority to a path. Moreover, additional information can be stored within map 310 to associate an element of map 310 to a specific node in a cluster.

Map 310, as shown, resides within a first host computer, referred to as node 1. The status indicator allotted for node 1 is therefore referring to the status of paths that are locally visible to node 1. Status indicators for nodes 2 through N indicate the status of network paths existing between the first host computer and the other host computers, respectively, in the cluster. As shown, map 310 indicates that all paths are present and available for use in distributing I/O requests to a storage device. In the event that paths become unavailable, a status indicator for the respective node would need to be changed from a "present" status to an "absent" status to reflect such a change. Using map indicators in map 310 allows a multi-pathing module to identify present and available paths (on a per-node basis) and perform load-balancing to optimize the routing of I/O requests to a storage device.

FIG. 3B illustrates an example of an updated map 320. Updated map 320 is a variation of map 310 after a path change has been detected. For example, in the event that a new path is discovered or existing paths are changed from a present status to absent status or vice versa, map 310 is updated accordingly. Updated map 320 illustrates that paths existing from node 1 to node 2 have been changed from a present to an absent state. When the event change is detected, the map indicator for node 2 is changed from a present state to an absent state, as shown. Map 320 can continue to change as further path changes are detected.

FIG. 3C illustrates an example of an updated map extension 330. Updated map extension 330 is an extension of updated map 320 in FIG. 3B. Updated map extension 330 includes additional information than that included in updated map 320. As shown, updated map extension 330 includes a status indicator for each individual path existing from a host computer to a storage device (local and network paths included). As shown, nodes 1-N are the nodes in a cluster and each of nodes 1-N includes two distinct paths (e.g. locally visible paths) existing from the respective node to the storage device. Updated map extension 330 illustrates that locally visible paths 1 and 2 existing from node 2 to the storage device have become absent and thus inaccessible, rendering node 2 inaccessible to the first host computer.

FIG. 3D illustrates another example of an updated map extension 340. Updated map extension 340 illustrates an extension of updated map 320 in FIG. 3B. As shown, updated map extension 340 includes a status indicator for each individual local path existing from a host computer to a storage device. In addition, updated map extension 340 includes a status indicator for network paths existing from a host computer to a storage device via other nodes in a cluster, on a per-node basis. Updated map extension 340 illustrates that network paths existing from node 2 to the storage device have become absent and thus inaccessible.

Figure 4A:
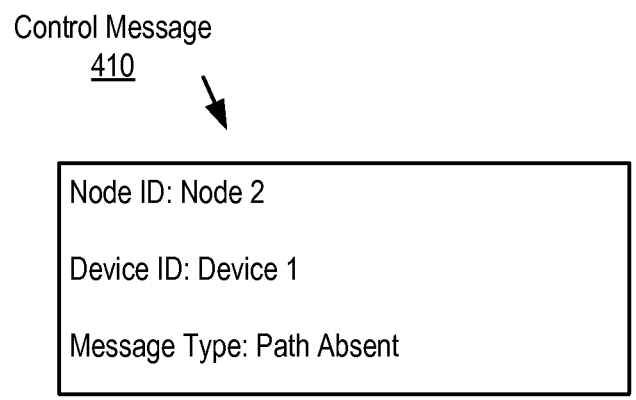
FIG. 4A illustrates an example of a control message, according to one embodiment of the present invention.
Figure 4B:
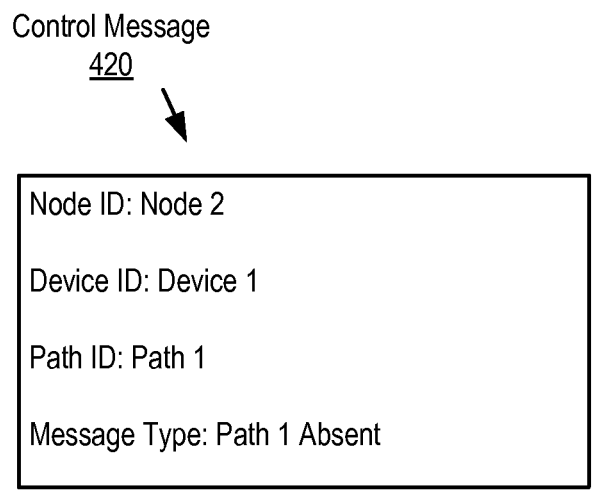
FIG. 4B illustrates another example of a control message, according to one embodiment of the present invention.

FIGS. 4A & 4B illustrate example contents of a control message 410. Control messages can be generated by a multi-pathing module whenever a change to a locally visible path has been detected. In addition, control messages can also be generated to indicate changes to a host computer, a storage area network, and/or a storage system.

In the event that a change to a local path has been detected, a multi-pathing module generates and transmits a control message, such as control message 410, to some or all of the host computers in a cluster to notify those host computers of the path changes. Control message 410 includes information identifying a host computer from which control message 410 originated, a storage device, and the type of event change that is being reported by control message 410. A host computer from which control message 410 originated is identified by a unique node identifier, illustrated as a node ID. Such a node identifier is global (at least within the cluster) and thus uniquely identifies a host computer from other host computers and components within a cluster. As shown, control message 410 indicates that control message 410 originated from node 2 (e.g., host computer 2).

A storage device is identified by a storage device identifier, illustrated as a device ID. A device identifier is also global and serves to uniquely identify a specific storage device. For example, a storage device can identify a specific disk device within a storage system. As shown, control message 410 identifies device 1 within a storage system. Thus, control message 410 pertains to a path that is locally visible and exists from node 2 to device 1.

The type of event change being reported by control message 410 is identified by a message type. This message type indicates the status of the locally visible path existing between the host computer identified by the node ID and the storage device identified by the device ID. A message type can indicate, for example, whether a path has been created or the status of a previously existing path has changed. As shown, control message 410 indicates that the status of a previously existing path has been changed to an absent state. Specifically, control message 410 indicates that paths existing from node 2 to device 1 are absent and thus inaccessible.

Although not shown, additional information can be included in control message 410. One example of additional information that can be included is information identifying a particular local path between a host computer and a storage device. Such an example is illustrated in FIG. 4B with control message 420.

Control message 420 includes a node ID, device ID, and message type, similar to control message 410 in FIG. 4A, to help identify node 2, device 1, and an event change in which a previously existing local path is changed to an absent state. In addition, control message 420 includes a path identifier, illustrated as path ID, to indicate the particular path that is being referenced by control message 420. A path ID might be included in a control message when a host computer has multiple paths to a storage device and a single path is identified by the device ID.

Additional information (such as port ID, primary/preferred path, and the like) can also be included in a control message when a host computer wishes to track paths present on a particular host computer within a cluster (e.g., a host computer intended as a target for data requests). These paths can be tracked individually, and not collectively, from a host computer to a storage device. As shown, control message 420 indicates that path 1 existing from node 2 to disk 1 has been changed to an absent state. Additional information, aside from the information illustrated in control messages 410 and 420, can also be included in a control message.

Figure 5A:
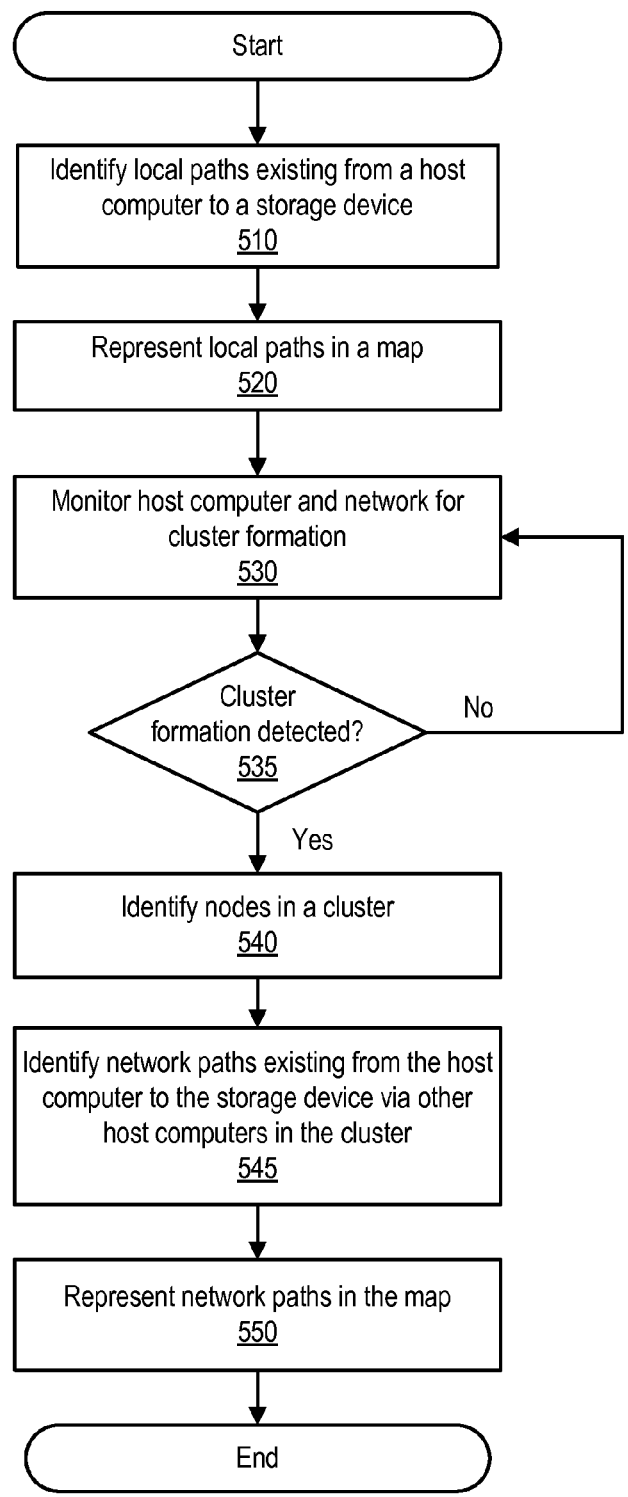
FIG. 5A is a flowchart illustrating an example of a process for initializing a host computer and a corresponding map at a host computer, according to one embodiment of the present invention.

FIG. 5A illustrates an example of a process for initializing a map corresponding to a single storage device to which a host computer is coupled. The process of FIG. 5A is performed by a multi-pathing module (such as multi-pathing module 130 of FIG. 2). The corresponding map can be generated and stored within a meta-node (such as meta-node 210 of FIG. 2).

The process of FIG. 5A is performed by a multi-pathing module when a host computer is first initialized. In addition, the process of FIG. 5A can be repeated to initialize each storage device to which a host computer is coupled, thereby producing a map that corresponds to each storage device. A list identifying each storage device to which a host computer is coupled can be obtained, for example, by a multi-pathing module, a host computer, a storage area network, and/or a storage system.

The process begins at 510 where the multi-pathing module identifies local paths existing from the host computer to a storage device. Once identified, indicators and/or values are assigned to the map to represent the local paths at 520. Information regarding the local paths can include, for example, general indicators (e.g., "1" or "0" values, present/absent indicators, degraded indicators, available/unavailable indicators, or up/down indicators) that indicates whether at least one local path exists from the host computer to the storage device.

Thereafter, the process continues to 530, where the multi-pathing module begins monitoring the host computer and network for possible cluster formation. At 535, a determination is made as to whether the host computer has joined a cluster. A multi-pathing module can detect the formation of a cluster when the multi-pathing module receives messages and information regarding other host computers that are joining or have joined the cluster.

In the event that a cluster formation is not detected, the process reverts back to 530 where the multi-pathing module continues to monitor the host computer and the network for possible cluster formation. Alternatively, if a cluster formation is detected, the process continues to 540 where the multi-pathing module identifies the nodes in a cluster. The nodes in the cluster can be identified using the contents of the messages (e.g., control messages) received from the other host computers in the cluster. For example, a control message can include a unique node identifier that uniquely identifies the host computer from which the control message was sent. A unique host identifier is an identifier that is unique to a host computer and can be used to distinguish host computers within the cluster. Thus, extracting the node identifier information from each control message received by the multi-pathing module allows the multi-pathing module to identify the other host computers that are part of the same cluster.

The process then continues to 545, where the multi-pathing module identifies network paths that exist from the host computer to the storage device via other host computers in the cluster. Once again, the contents of control messages can be utilized to identify whether other host computers in the cluster are connected to the storage device via a local path. If a connection is established between the current host computer and the storage device via another host computer, a network path is said to exist.

Once the network paths have been identified, the multi-pathing module represents the network paths in the map at 550. Similarly to local paths, a general indicator can be added to the map to indicate which of the host computers in the cluster provide at least one network path for the host computer. At this point the process of FIG. 5A ends. The process of FIG. 5A, however, is repeatable and performed continuously by a multi-pathing module. This is because the multi-pathing module, once initialized, continues to monitor for changes in the cluster (similar to the process performed at 530). In the event that additional host computers join the cluster or existing host computers leave the cluster, the map created at 550 will need to be updated accordingly. By doing so, the multi-pathing module can operate in a way that ensures the original map is kept up-to-date, using, for example, the process of FIG. 5B.

Figure 5B:
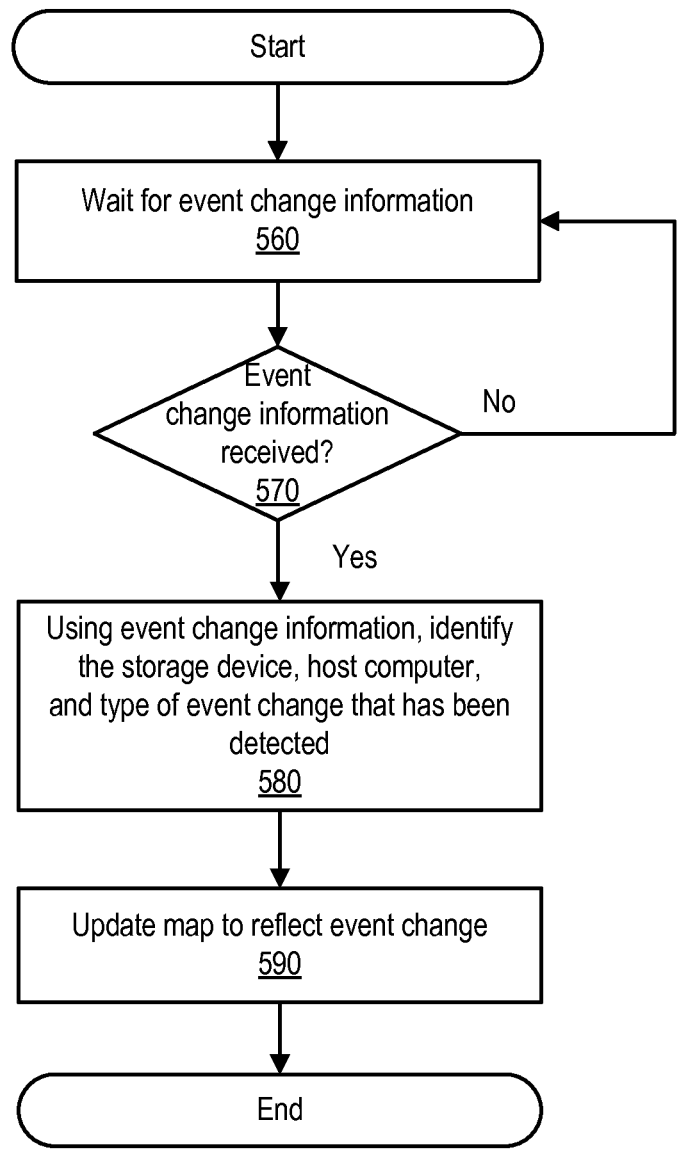
FIG. 5B is a flowchart illustrating an example of a process for updating a map at a host computer, according to one embodiment of the present invention.

FIG. 5B is a flowchart illustrating an example of a process for updating the map at the host computer. The process of FIG. 5B is performed by a multi-pathing module. The process of FIG. 5B begins at 560 where the multi-pathing module awaits the receipt of event change information. The process continues to 570, where the multi-pathing module makes a determination as to whether event change information has been received.

Event change information is provided to a map via a disk connectivity module (such as disk connectivity module 230 of FIG. 2). This event change information can be provided by the disk connectivity module whenever the disk connectivity module detects an event change that affects local and/or network paths. For example, event change information can be provided to a map whenever a local path is made accessible or inaccessible or whenever a new local path is established. Event change information can also be provided to a map whenever a network path is made accessible or inaccessible or whenever a new network path has been established. A network path may be newly established or changed in cases where a local path on another host computer becomes accessible or inaccessible or in cases where a host computer joins or leaves the cluster.

Whenever an event change is detected by a disk connectivity module, the disk connectivity module provides the relevant information to a map to allow the map to update its information. The determination of 570 determines whether such event change information has been received. If no event change information has been received, the process reverts back to 560 where the multi-pathing module continues to await the receipt of event change information.

Alternatively, if event change information has been received, the process continues to 580. At 580, the multi-pathing module uses the event change information to identify how a map will be updated. First, the multi-pathing module identifies the storage device and host computer to which the event change information applies. This information can be obtained from a storage device identifier and node identifier extracted from a control message.

By identifying both a storage device and a host computer, a multi-pathing module can identify whether the event change pertains to a local path or a network path. For example, if a multi-pathing module located within host computer 1 determines that the event change information pertains to host computer 1 and a first storage device, host computer 1 will determine that the event change pertains to a local path. On the other hand, if the same multi-pathing module determines that the event change information pertains to host computer 2 (another node in the cluster) and the first storage device, host computer 1 will determine that the event change pertains to a network path.

Once the storage device and host computer have been identified, the multi-pathing module then identifies the type of event change that has been detected. Once again, information regarding the type of event change can also be extracted from a control message. Event changes can include, for example, events pertaining to a node, storage device, path, network, and the like. For example, a node event can include scenarios in which a node is added to a cluster, a node is removed from a cluster, a node has joined a cluster, or a node has left a cluster. A device event can include scenarios in which a storage device is added, removed, made accessible or inaccessible, shared, or unshared. A path event can include scenarios in which a path has been added, removed, or has changed its accessibility status. A network event can include scenarios in which a network between host computers has been added, removed, or changed. An event change can also arise from changes to a collection of paths or devices undergoing similar events.

Once the event change information has interpreted, the process continues to 590 where the map is updated to reflect the event change. The way in which a map is updated can vary depending on the type of event change that has been detected. For example, the changes to be made to a map can vary if the event change indicates that a new node has joined a cluster, an existing node is leaving a cluster, a storage device is being shared or unshared, a local or network path has become accessible or inaccessible (e.g., due to a failure or restoration of a path), and/or a local or network path has changed its attributes.

An event change indicating that a new host computer has joined a cluster may result in possible network path changes. For example, if a map for host computer 1 and storage device is being updated, the connection status of the new host computer to storage device 1 is analyzed. If the new host computer shares a connection with storage device 1, then the new host computer is added to the map to indicate that the new host computer provides a new network path for host computer 1 to storage device 1. In the event that the new host computer shares a connection with storage device 2, host computer 1 can add a new map corresponding to storage device 2 to indicate that the new host computer provides a network path from host computer 1 to storage device 2.

If an event change indicates that an existing host computer is leaving the cluster, changes to a map can be made to indicate such an event. Any network paths corresponding to the host computer that is leaving the cluster will be removed from the maps of the remaining host computers in the cluster. If the host computer that is leaving provided the last available path to a particular storage device, a map corresponding to the storage device can be removed altogether. However, such an action might require all I/Os to complete before the map can be removed.

In cases where an event change indicates that a storage device is being shared or unshared, the changes to be made to a map are similar to those in which a host computer is joining or leaving a cluster. A storage device that was previously shared may be further shared with additional host computers in a cluster, or the previously shared storage device may be unshared with a subset of host computers in a cluster.

Additionally, an event change can indicate that a path's accessibility may have changed due to a failure in a path or the restoration of a path. In other cases, an event change can indicate that certain attributes for a path may have changed. For example, the status of a path may have changed from a "preferred" status to a "non-preferred" status or the like. Such event changes can also lead to changes in a map to indicate the availability or preferences for certain paths.

At this point, the process ends. The process of FIG. 5B, however, is repeatable and performed continuously by a multi-pathing module. Thus, once an event change has been processed at FIG. 5B and the process completes the updating at 590, the multi-pathing module can re-initiate the process of FIG. 5B to await the receipt of further event change information.

Figure 6:
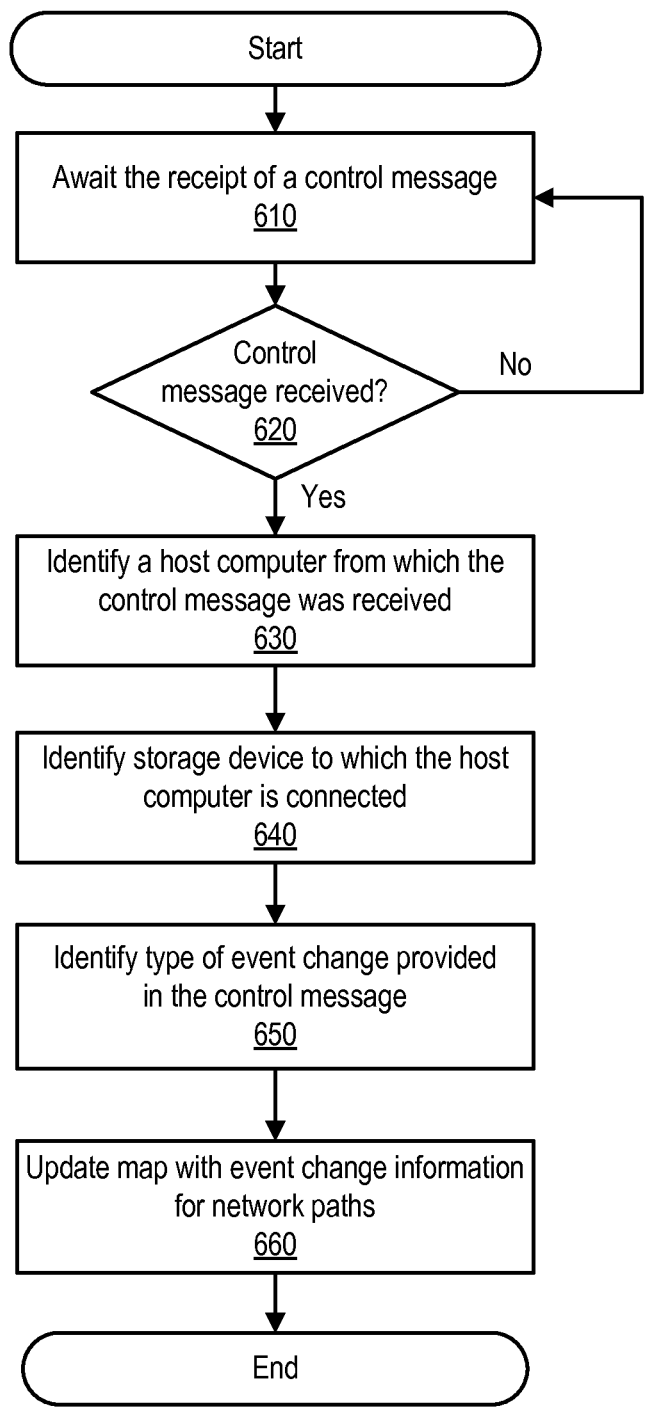
FIG. 6 is a flowchart illustrating an example of a process for processing control messages at a host computer, according to one embodiment of the present invention.

FIG. 6 is a flowchart illustrating an example of a process for processing control messages at a host computer. The process of FIG. 6 can be performed by a disk connectivity module (such as disk connectivity module 230 of FIG. 2). A disk connectivity module can be integrated within a multi-pathing module, as illustrated in FIG. 2. Alternatively, a disk connectivity module can also be external to a multi-pathing module.

The process of FIG. 6 begins at 610 where the disk connectivity module awaits the receipt of control messages. At 620, a determination is made as to whether a control message has been received by a disk connectivity module. If no control message has been received, the process reverts back to 610, where the disk connectivity module continues to await the receipt of a control message. Alternatively, if a control message has been received by a disk connectivity module, the process continues to 630.

At 630, the disk connectivity module identifies a host computer from which a control message was received. A control message typically includes information, such as a unique node ID, which identifies the host computer from which the control message was sent. At 640, the disk connectivity module identifies the storage device to which the identified host computer is coupled. This storage device is usually identified by a device ID, which is also included in the control message.

Similarly, a type of event change is identified by the disk connectivity module at 650. Information regarding a type of event change is typically included within a control message. Examples of event changes can include the introduction of a new path, the removal of a path that was previously accessible, and/or the addition of a path that was previously inaccessible. Thus, given the combination of 630, 640, and 650, a disk connectivity module can determine the host computer from which a control message was received and the status of a connection path existing between the two host computers and the storage device. For example, a control message received at host computer 1 can identify that the control message originated from a host computer 2, that host computer 2 is coupled to a first storage device, and that a path existing between host computer 1, host computer 2, and the first storage device has become inaccessible.

Once the host computer, storage device, and event type have been identified, the process continues to 660 where the disk connectivity module provides the event change information to a map to allow the map to be updated. In cases where the disk connectivity module resides within the multi-pathing module, a simple notification can be provided to update the map with the event change information. However, in cases where the disk connectivity module is external to the multi-pathing module, the disk connectivity module can send event change information to the multi-pathing module. Once the event change information is received, map information pertaining to network paths can be updated, using for example, the process of FIG. 5B.

At this point, the process ends. The process of FIG. 6, however, is repeatable and performed continuously by a disk connectivity module, once a cluster has been formed. Thus, once an event change has been processed, the disk connectivity module can re-initiate the process of FIG. 6 to await the receipt of further control messages.

Figure 7:
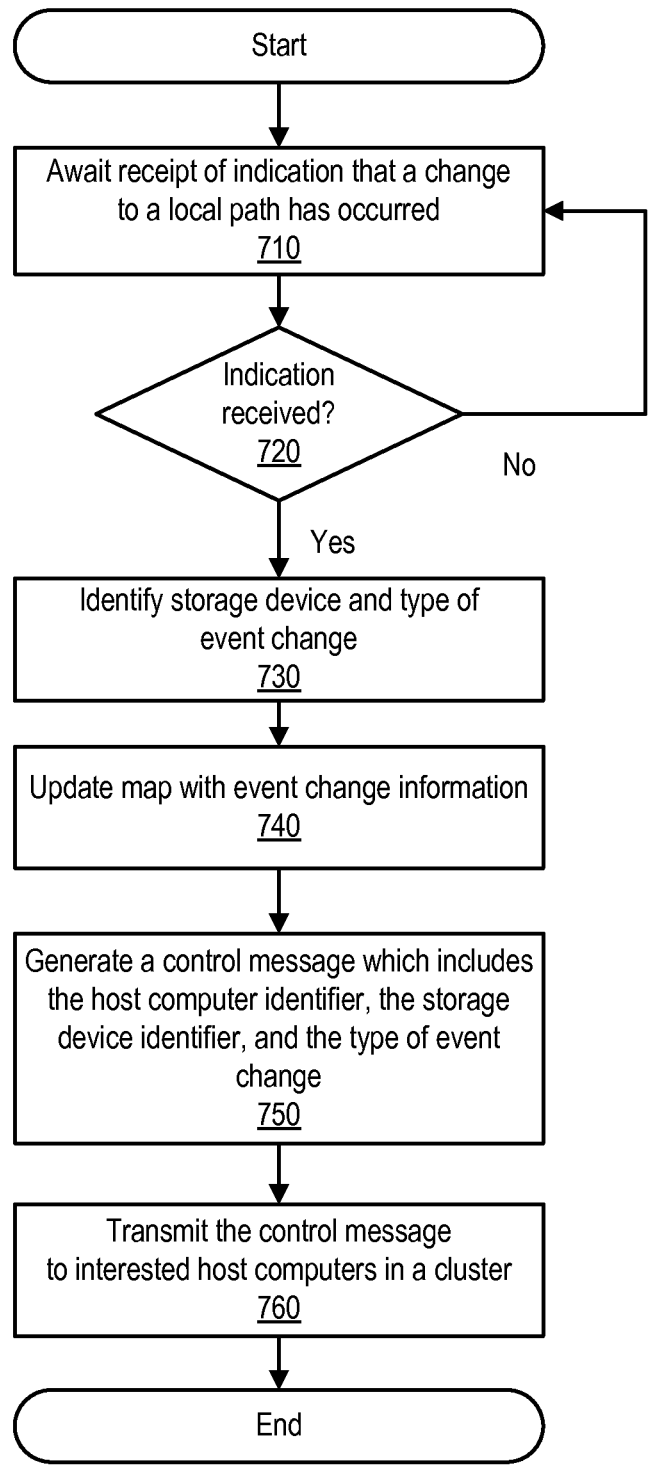
FIG. 7 is a flowchart illustrating an example of a process for managing paths existing from a host computer, according to one embodiment of the present invention.

FIG. 7 is a flowchart illustrating an example of a process for monitoring local paths at a host computer. The process of FIG. 7 is performed by a disk connectivity module (such as disk connectivity module 230 of FIG. 2). Alternatively, a disk connectivity module can also be external to a multi-pathing module.

The process of FIG. 7 begins at 710 where the disk connectivity module awaits the receipt of an indication (e.g., an indication of an event) that a change to a local path has occurred.

At 720, a determination is made as to whether such a notification has been received. A change in local paths can arise from various circumstances. For example, a change in local paths can be detected when a new local path from the host computer to the storage device is generated. In addition, a change in local paths can be detected when an existing local path that was previously inaccessible become accessible to the host computer or vice versa.

If a determination is made at 720 that a notification of a change to a local path has not been received, the process reverts back to 710 to await the receipt of such a notification. Alternatively, if a determination is made at 720 that a notification of a change to a local path has been received, the process continues to 730. At 730, the event change is identified. This includes identifying a path and the type of event change that has occurred (e.g., new path created, previous path made inaccessible, or previous path made accessible).

Once the event change is identified, the disk connectivity updates a map with event change information at 740. In cases where a disk connectivity module resides within a multi-pathing module, a simple notification can be provided to update the map. However, in cases where the disk connectivity module is external to a multi-pathing module, the disk connectivity module can send event change information via a suitable mechanism. Once the event change information is received, previous map information pertaining to local paths can be updated at the multi-pathing module.

The process then continues to 750 where a control message is generated by the disk connectivity module. Such a control message identifies the host computer via a node ID and the storage device via a device ID. In addition, the control message also identifies the type of event change that has occurred. This information is put together in a control message which is then transmitted to interested host computers at 760. An interested host computer can include, for example, any or all host computers in the cluster that are interested in performing I/O data requests via the host computer.

The control message is sent to interested host computers in a cluster, to enable those host computers to update their respective network path information. At this point, the process of FIG. 7 is complete. The process of FIG. 7 is repeatable and performed by a disk connectivity module on a continuous basis. Thus, once an event change has been processed, the disk connectivity module re-initiates the process of FIG. 7 to await the receipt of further indications that changes to local paths have occurred.

Figure 8:
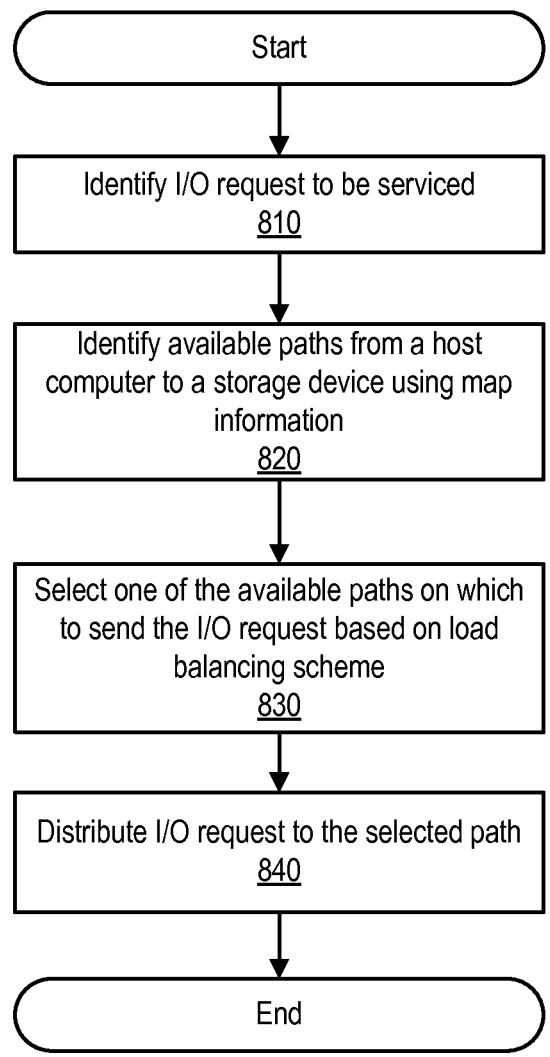
FIG. 8 is a flowchart illustrating an example of a process for selecting a path for distribution of I/O requests at a host computer, according to one embodiment of the present invention.

FIG. 8 is a flowchart illustrating an example process for selecting a path for distribution of I/O requests using map information. The process of FIG. 8 can be performed by a multi-pathing module (such as multi-pathing module 130 of FIG. 2). In addition, the process of FIG. 8 is repeatable and performed by a multi-pathing module anytime an I/O request is received by a host computer.

The process of FIG. 8 begins at 810 where an I/O request to be serviced by the host computer is identified. An I/O request relates to information stored within a storage device. At 820, the multi-pathing module identifies available paths existing from the host computer to a storage device using map information. Such map information is generated and stored in a map within the multi-pathing module. The map information is initially generated whenever a host computer is initialized and when the host computer joins a cluster. Thereafter, map information is updated continuously as a result of event changes that affect the accessibility of a path or as a result of an I/O request that has been sent and failed. In this manner, map information is kept up-to-date. Using this information, the multi-pathing module is able to identify all available paths that currently exist from a host computer to a storage device at the time an I/O request is received.

Once the available paths have been identified, the process continues to 830 where one of the available paths is selected for the I/O request. An available path can be selected from the set of available paths based on load balancing schemes implemented by a multi-pathing module. Load balancing is a scheme in which the characteristics of each available path is considered and compared to determine an optimal path to use for transmitting an I/O request to a storage device. For example, load balancing at a multi-pathing module can consider the capacity, current workload, and bandwidth for each available path, as well as user configured policies and desired performance characteristics to determine the most capable and/or least burdened path from the host computer to the storage device. At 840, the process distributes the I/O request to the selected path. At this point, the process for distributing an individual I/O request at the host computer ends. As noted, the process of FIG. 8 is repeatable and performed every time a host computer receives an I/O request.

Figure 9:
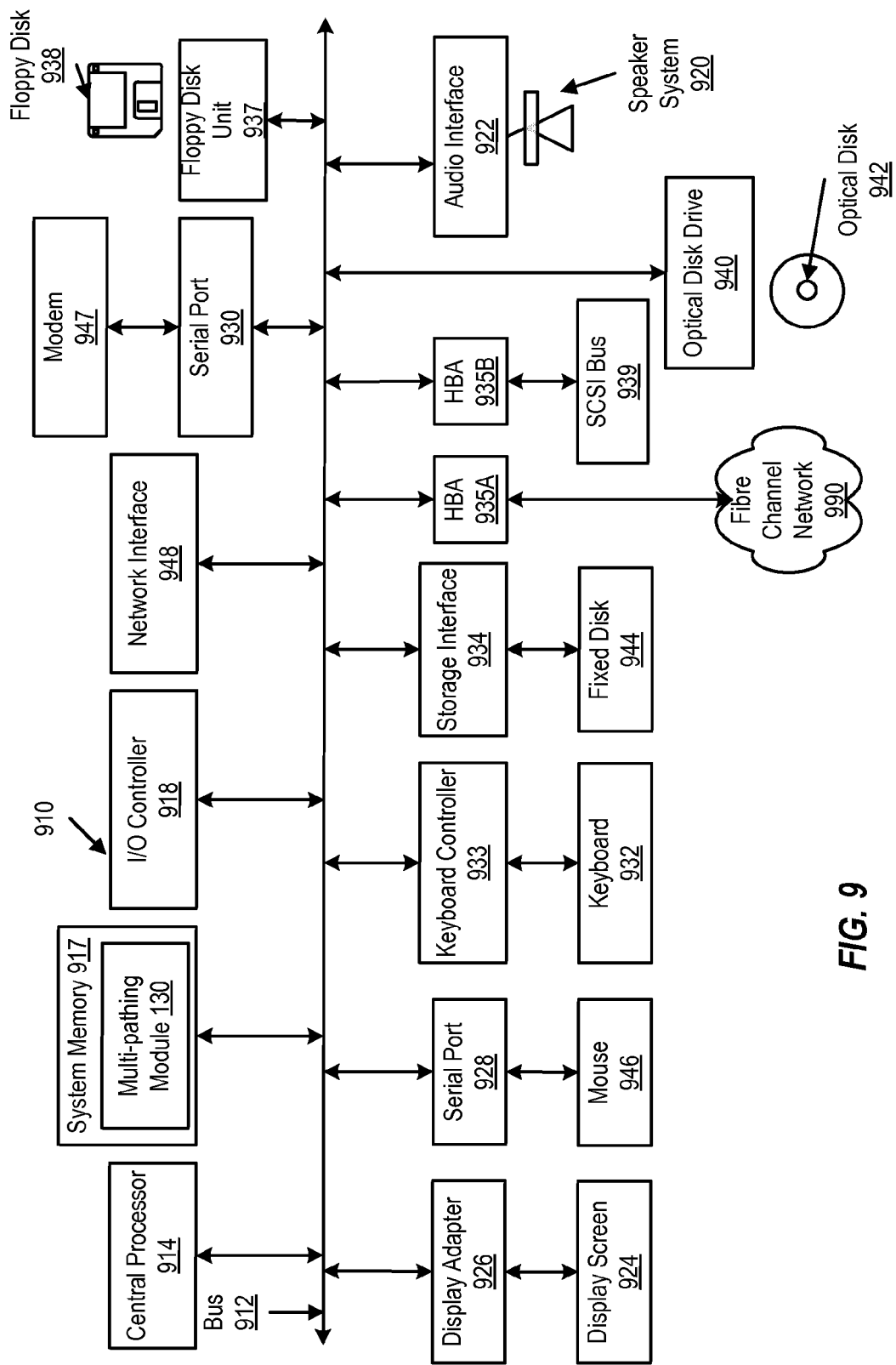
FIG. 9 is a block diagram of a computing system, according to one embodiment of the present invention.

FIG. 9 is a block diagram of a computing system suitable for discovering paths existing from a host computer to a storage device, as described above. Computer system includes a bus 912 which interconnects major subsystems of computer system 910, such as a central processor 914, a system memory 917 (typically RAM, but which can also include ROM, flash RAM, or the like, and which can also include software such as multi-pathing module 130), an input/output controller 918, an external audio device, such as a speaker system 920 via an audio output interface 922, an external device, such as a display screen 924 via display adapter 926, serial ports 928 and 930, a keyboard 932 (interfaced with a keyboard controller 933), a storage interface 934, a floppy disk unit 937 operative to receive a floppy disk 938, a host bus adapter (HBA) interface card 935A operative to connect with a Fibre Channel network 990, a host bus adapter (HBA) interface card 935B operative to connect to a SCSI bus 939, and an optical disk drive 940 operative to receive an optical disk 942. Also included are a mouse 946 (or other point-and-click device, coupled to bus via serial port 928), a modem 947 (coupled to bus 912 via serial port 930), and a network interface 948 (coupled directly to bus 912).

Bus 912 allows data communication between central processor 914 and system memory 917, which can include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 910 are generally stored on and accessed via a computer-readable medium, such as a hard disk drive (e.g., fixed disk 944), an optical drive (e.g., optical disk drive 940), a floppy disk unit 937, or other storage medium. Additionally, applications can be in the form of electronic signals modulated in accordance with the application and data communication technology when accessed via modem 947 or network interface 948.

Storage interface 934, as with the other storage interfaces of computer system 910, can connect to a standard computer-readable medium for storage and/or retrieval of information, such as a fixed disk drive 944. Fixed disk drive 944 can be a part of computer system 910 or can be separate and accessed through other interface systems. Modem 947 can provide a direct connection to a remote server via a telephone link or to the Internet via an internet service provider (ISP). Network interface 948 can provide a direct connection to a remote server via a direct network link to the Internet via a POP (point of presence). Network interface 948 can provide such connection using wireless techniques, including digital cellular telephone connection, Cellular Digital Packet Data (CDPD) connection, digital satellite data connection or the like.

Many other devices or subsystems (not shown) can be connected in a similar manner (e.g., document scanners, digital cameras, and so on). Conversely, all of the devices shown in FIG. 9 need not be present to practice the present invention. The devices and subsystems can be interconnected in different ways from that shown in FIG. 9. The operation of a computer system is readily known in the art and is not discussed in detail in this application. Code to implement the present invention can be stored in computer-readable storage media such as one or more of system memory 917, fixed disk 944, optical disk 942, or floppy disk 938. The operating system provided on computer system 910 can be MS-DOS®, MS-WINDOWS®, OS/2®, UNIX®, Linux®, or another known operating system.

Figure 10:
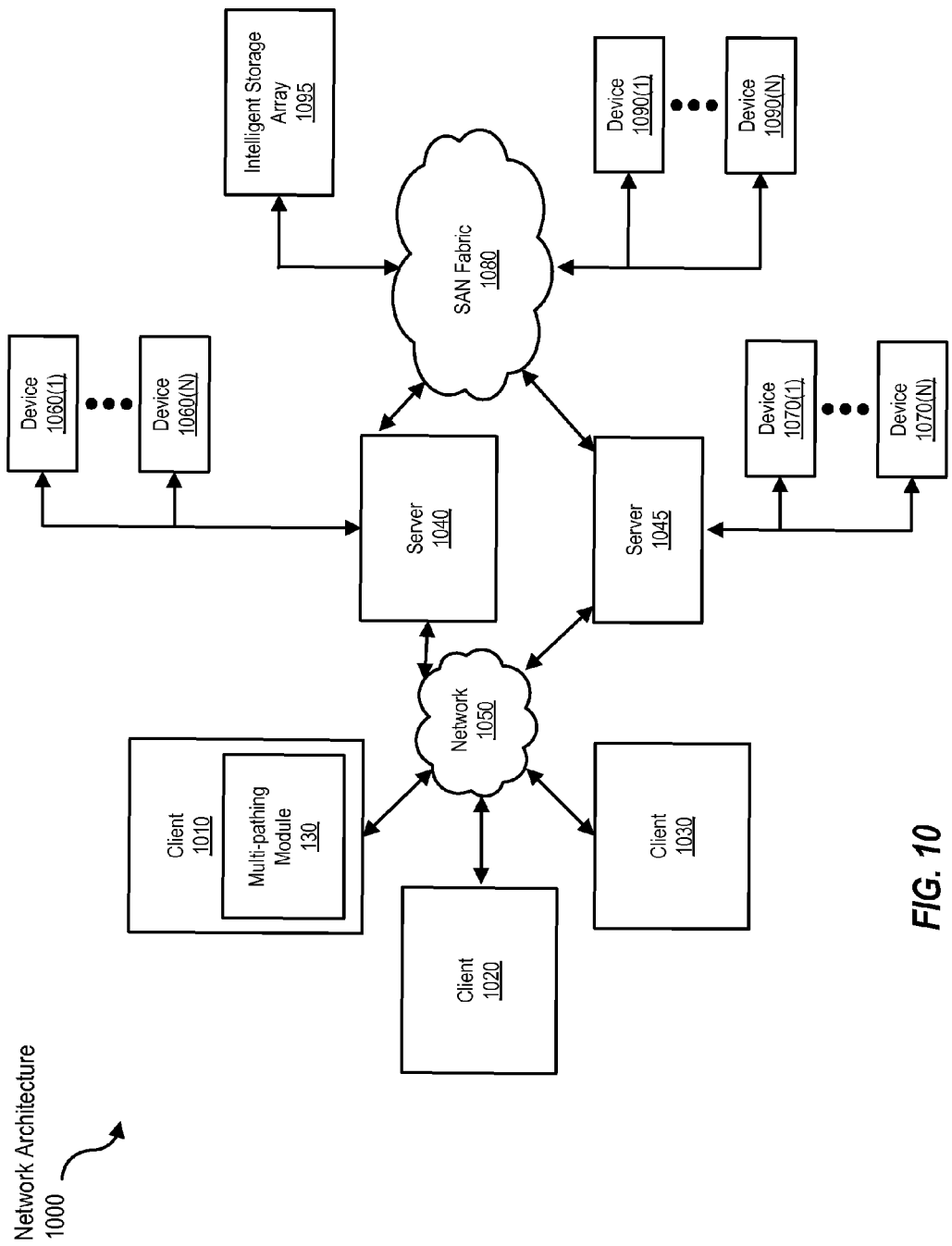
FIG. 10 is a block diagram of a network system, according to one embodiment of the present invention.

FIG. 10 is a block diagram of a network system 1000 in which client systems 1010, 1020, and 1030 and servers 1040 and 1045 can be coupled to a network 1050. Client systems 1020 and 1030 generally represent any type or form of computing device or system, such as computing system 910 in FIG. 9.

Similarly, servers 1040 and 1045 generally represent computing devices or systems, such as application servers or database servers, configured to provide various database services and/or run certain software applications, such as computing system 910 in FIG. 9. Network 1050 generally represents any telecommunication or computer network including, for example, an intranet, a wide area network (WAN), a local area network (LAN), a personal area network (PAN), or the Internet. In one example, client systems 1010, 1020, and/or 1030 and/or servers 1040 and/or 1045 can include a multi-pathing module 130, as shown in FIG. 2.

As illustrated in FIG. 10, one or more storage devices 1060(1)-(N) can be directly attached to server 1040. Similarly, one or more storage devices 1070(1)-(N) can be directly attached to server 1045. Storage devices 1060(1)-(N) and storage devices 1070(1)-(N) generally represent any type or form of storage device or medium capable of storing data and/or other computer-readable instructions. In certain embodiments, storage devices 1060(1)-(N) and storage devices 1070(1)-(N) can represent network-attached storage (NAS) devices configured to communicate with servers 1040 and 1045 using various protocols, such as Network File System (NFS), Server Message Block (SMB), or Common Internet File System (CIFS).

Servers 1040 and 1045 can also be connected to a storage area network (SAN) fabric 1080. SAN fabric 1080 generally represents any type or form of computer network or architecture capable of facilitating communication between multiple storage devices. SAN fabric 1080 can facilitate communication between servers 1040 and 1045 and a plurality of storage devices 1090(1)-(N) and/or an intelligent storage array 1095. SAN fabric 1080 can also facilitate, via network 1050 and servers 1040 and 1045, communication between client systems 1010, 1020, and 1030 and storage devices 1090(1)-(N) and/or intelligent storage array 1095 in such a manner that devices 1090(1)-(N) and array 1095 appear as locally attached devices to client systems 1010, 1020, and 1030. SAN fabric 1080 utilizes Internet Small Computer System Interface (iSCSI) protocol to link storage facilities, thereby allowing for the consolidation of storage into data center storage arrays and providing host computers with the illusion of locally attached storage devices. As with storage devices 1060(1)-(N) and storage devices 1070(1)-(N), storage devices 1090(1)-(N) and intelligent storage array 1095 generally represent any type or form of storage device or medium capable of storing data and/or other computer-readable instructions.

In certain embodiments, and with reference to computing system 910 of FIG. 9, a communication interface can be used to provide connectivity between each client system 1010, 1020, and 1030 and network 1050. Client systems 1010, 1020, and 1030 can be able to access information on server 1040 or 1045 using, for example, a web browser or other client software. Such software can allow client systems 1010, 1020, and 1030 to access data hosted by server 1040, server 1045, storage devices 1060(1)-(N), storage devices 1070(1)-(N), storage devices 1090(1)-(N), or intelligent storage array 1095. Although FIG. 10 depicts the use of a network for exchanging data, the embodiments described and/or illustrated herein are not limited to any particular network-based environment.

In at least one embodiment, all or a portion of one or more of the embodiments disclosed herein can be encoded as a computer program and loaded onto and executed by server 1040, server 1045, storage devices 1060(1)-(N), storage devices 1070(1)-(N), storage devices 1090(1)-(N), intelligent storage array 1095, or any combination thereof. All or a portion of one or more of the embodiments disclosed herein can also be encoded as a computer program, stored in server 1040, run by server 1045, and distributed to client systems 1010, 1020, and 1030 over network 1050.

In some examples, all or a portion of the computing devices in FIGS. 1, 2, 9, and 10 can represent portions of a cloud-computing or network-based environment. Cloud-computing environments can provide various services and applications via the Internet. These cloud-based services (e.g., software as a service, platform as a service, infrastructure as a service, etc.) can be accessible through a web browser or other remote interface. Various functions described herein can be provided through a remote desktop environment or any other cloud-based computing environment.

In addition, one or more of the components described herein can transform data, physical devices, and/or representations of physical devices from one form to another. For example, a multi-pathing module 130 in FIG. 2 can transform connectivity information into a global representation of a cluster at a node.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   receiving a control message at a multi-pathing module of a first node, wherein
   the first node comprises a first computer system,
   the first node is one of a plurality of nodes, and
   the plurality of nodes are configured to form a cluster by virtue of, at least in part, being configured to communicate with one another via a network;
   identifying a second node of the plurality of nodes as a node from which the control message was received, wherein
   the multi-pathing module performs, at least in part, the identifying the second node, and
   the second node comprises a second computer system;
   identifying a storage device to which the second node is coupled, wherein
   the multi-pathing module performs, at least in part, the identifying the storage device, and
   the second node and the storage device are configured to communicate with one another via a storage area network; and
   determining a status of a connection path, wherein
   the multi-pathing module performs, at least in part, the determining, and
   the connection path is between the first node and the second node via the network, and the second node and the storage device via the storage area network.

2. The method of claim 1, wherein
   the control message is received at a disk connectivity module of the multi-pathing module,
   the multi-pathing module comprises
   the disk connectivity module, and
   a meta-node, and
   the method further comprises
   communicating connectivity information from the disk connectivity module to the meta-node.

3. The method of claim 2, wherein
   the meta-node comprises a map,
   the method further comprises
   storing the connectivity information in the map.

4. The method of claim 1, further comprising:
   detecting that the status of the connection path indicates that a connection path has been established from the first node to the second node; and
   generating event change information.

5. The method of claim 4, further comprising:
   storing the event change information in a map.

6. The method of claim 1, further comprising:
   detecting that the status of the connection path indicates that a previous connection path from the first node to the second node has changed; and
   generating state change information.

7. The method of claim 6, further comprising:
   storing the state change information in a map.

8. The method of claim 1, wherein
   the control message is received at a disk connectivity module of the multi-pathing module,
   the multi-pathing module comprises
   the disk connectivity module, and
   a meta-node comprising a data structure, and
   the method further comprises
   communicating connectivity information from the disk connectivity module to the meta-node, and
   storing the connectivity information in the data structure.

9. The method of claim 6, wherein the connectivity information comprises:
   path information, representing a plurality of paths from the first node to the storage device and comprising
   information indicating which of the plurality of nodes are connected to the first node via a path, and
   information indicating which of the plurality of nodes have access to the storage device, and
   node information representing the plurality of nodes.

10. The method of claim 7, further comprising:
    updating at least a portion of the information in the connectivity information, based on one or more changes to connectivity status for at least one of the plurality of paths.

11. The method of claim 8, further comprising:
    selecting a selected path of the plurality of paths, wherein
    the selecting is performed using the at least the portion of the information in the connectivity information; and
    distributing an I/O request on the selected path.

12. A computer program product comprising:
    a plurality of instructions configured to implement a multi-pathing module, comprising
    a first set of instructions, executable on a first computer system, configured to
    receive a control message at a first node, wherein
    the first node comprises the first computer system,
    the first node is one of a plurality of nodes, the first node is configured to communicate with one or more other nodes of the plurality of nodes via a network, and the plurality of nodes form a cluster by virtue of, at least in part, being configured to communicate with one another via the network, a second set of instructions, executable on the first computer system, configured to identify a second node of the plurality of nodes as a node from which the control message was received, wherein the second node comprises a second computer system, and the plurality of nodes comprises the second node, a third set of instructions, executable on the first computer system, configured to identify a storage device to which the second node is coupled, wherein the second node and the storage device are configured to communicate with one another by a storage area network, and a fourth set of instructions, executable on the first computer system, configured to determine a status of a connection path, wherein the connection path is between the first node and the second node via the network, and the second node and the storage device via the storage area network; and a non-transitory computer-readable storage medium, wherein the instructions are encoded in the non-transitory computer-readable storage medium.

13. The computer program product of claim 12, wherein the control message is received at a disk connectivity module of the multi-pathing module, the multi-pathing module comprises
the disk connectivity module, and
a meta-node comprising a map, and the instructions further comprise
a fifth set of instructions, executable on the first computer system, configured to communicate connectivity information from the disk connectivity module to the meta-node, and
a sixth set of instructions, executable on the first computer system, configured to store the connectivity information in the map.

14. The computer program product of claim 12, wherein the instructions further comprise:

a fifth set of instructions, executable on the first computer system, configured to detect that the status of the connection path indicates that a connection path has been established from the first node to the second node;

a sixth set of instructions, executable on the first computer system, configured to generate event change information; and a seventh set of instructions, executable on the first computer system, configured to store the event change information in a map.

15. The computer program product of claim 12, wherein the instructions further comprise:

a fifth set of instructions, executable on the first computer system, configured to detect that the status of the connection path indicates that a previous connection path from the first node to the second node has changed;

a sixth set of instructions, executable on the first computer system, configured to generate state change information; and a seventh set of instructions, executable on the first computer system, configured to store the state change information in a map.

16. The computer program product of claim 12, wherein the control message is received at a disk connectivity module of the multi-pathing module, the multi-pathing module comprises
the disk connectivity module, and
a meta-node comprising a data structure, and the instructions further comprise
a fifth set of instructions, executable on the first computer system, configured to communicate connectivity information from the disk connectivity module to the meta-node, and
a sixth set of instructions, executable on the first computer system, configured to store the connectivity information in the data structure.

17. The computer program product of claim 16, wherein the connectivity information comprises:

path information, representing a plurality of paths from the first node to the storage device and comprising
information indicating which of the plurality of nodes are connected to the first node via a path, and
information indicating which of the plurality of nodes have access to the storage device, and node information representing the plurality of nodes.

18. The computer program product of claim 17, wherein the instructions further comprise:

a seventh set of instructions, executable on the first computer system, configured to update at least a portion of the information in the connectivity information, based on one or more changes to connectivity status for at least one of the plurality of paths;

a eighth set of instructions, executable on the first computer system, configured to select a selected path of the plurality of paths, wherein
the sixth set of instructions are configured to be executed using the at least the portion of the information in the connectivity information; and a ninth set of instructions, executable on the first computer system, configured to distribute an I/O request on the selected path.

19. A computer system comprising:

one or more processors;

a network interface, coupled to the one or more processors, wherein
the computer system is configured to be one of a plurality of computer systems forming a cluster by virtue of being configured to communicate with one another via a network, and
the computer system is configured to communicate with one or more other computer systems of the plurality of computer systems via the network, using the network interface;

a non-transitory computer-readable storage medium, coupled to the one or more processors; and a multi-pathing module, encoded in the non-transitory computer-readable storage medium, wherein
the multi-pathing module comprises
a disk connectivity module,
a meta-node, and
a plurality of instructions configured to cause the one or more processors to
receive a control message from another computer system of the plurality of computer systems via the network, identify a storage device to which the another computer system is coupled, wherein
the another computer system and the storage device are configured to communicate with one another via a storage area network, and
determine connectivity information for a connection path between the computer system and the another computer system via the network, and the another computer system and the storage device via the storage area network.

20. The computer system of claim 19, wherein the meta-node comprises a data structure, and the multi-pathing module is further configured to:
facilitate communication of the connectivity information from the disk connectivity module to the meta-node; and
store the connectivity information in the data structure.

* * * * *